US012313723B2

United States Patent
Wiffen (10) Patent No.: US 12,313,723 B2
(45) Date of Patent: May 27, 2025

(54) RADAR CHANNEL ESTIMATION

(71) Applicant: Kabushiki Kaisha Toshiba, Tokyo (JP)

(72) Inventor: Alfred Daniel Wiffen, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 261 days.

(21) Appl. No.: 17/711,184

(22) Filed: Apr. 1, 2022

(65) Prior Publication Data

US 2023/0314585 A1 Oct. 5, 2023

(51) Int. Cl.
*G01S 13/26* (2006.01)
*G01S 7/282* (2006.01)
*G01S 13/34* (2006.01)

(52) U.S. Cl.
CPC ............. *G01S 13/26* (2013.01); *G01S 7/282* (2013.01); *G01S 13/348* (2013.01)

(58) Field of Classification Search
CPC ......... G01S 13/26; G01S 7/282; G01S 13/348
See application file for complete search history.

(56) References Cited

U.S. PATENT DOCUMENTS

2016/0191020 A1* 6/2016 Velazquez ............... H04L 25/02
341/118
2016/0202346 A1* 7/2016 Anderson ............... G01S 7/292
342/179
2019/0339359 A1* 11/2019 Wang ...................... G01S 7/497
2020/0304135 A1* 9/2020 Manganaro ......... H03M 1/0626
2022/0283281 A1* 9/2022 Ishikawa .................. H01Q 3/30

FOREIGN PATENT DOCUMENTS

GB 2399982 A 9/2004

OTHER PUBLICATIONS

Morin et al., "Semi-Blind Deconvolution for Resolution Enhancement in Ultrasound Imaging", 2013 IEEE International Conference on Image Processing, IEEE, Sep. 2013, 7 pages.
Schenk et al., "Receiver-based compensation of transmitter-incurred nonlinear distortion in multiple-antenna OFDM systems", 2007 IEEE 66th Vehicular Technology Conference , 2007, 5 pages, doi: 10.1109/VETECF.2007.288.Products.

* cited by examiner

*Primary Examiner* — Peter M Bythrow
*Assistant Examiner* — Nazra Nur Waheed
(74) *Attorney, Agent, or Firm* — Oblon, McClelland, Maier & Neustadt, L.L.P.

(57) ABSTRACT

A radar return channel is estimated at a radar receiver by processing an existing channel estimate along with a radar return signal for an ideal transmission, to produce an updated estimate. Updating can be carried out based on a determination that the existing estimate has become degraded. Embodiments include using a least squares deconvolution to update polynomials describing a transfer function of the channel estimate.

20 Claims, 9 Drawing Sheets

RADAR CHANNEL ESTIMATION

FIELD

The present disclosure is in the field of radar technology.

DESCRIPTION OF EMBODIMENTS

Figure 1:
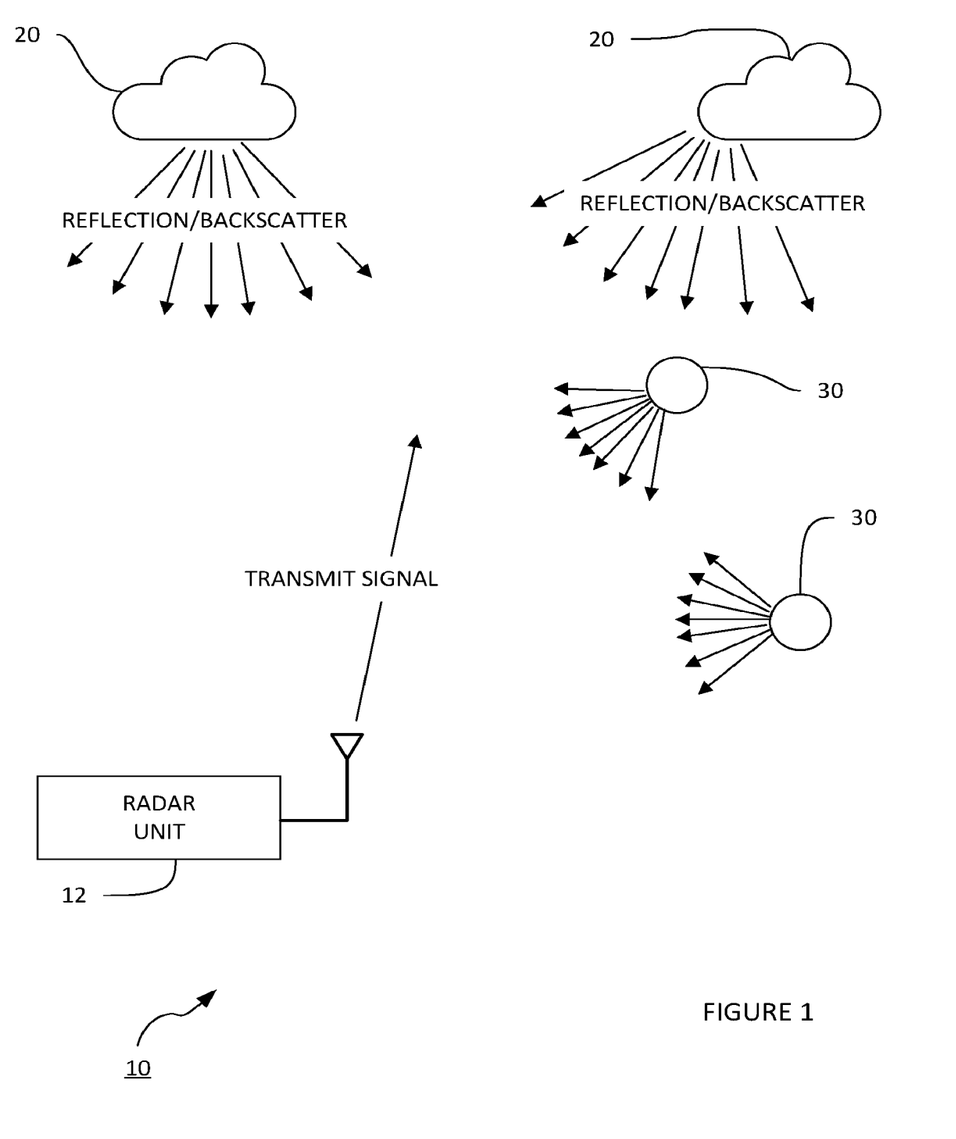
FIG. 1 illustrates implementation of a radar system in accordance with an embodiment.

A conventional radar system is illustrated in FIG. 1. As shown, a radar unit 12 emits transmit signals to an environment of interest. This causes the production of reflections and backscatter at one or more objects in the environment-in this case including clouds 20 and airborne objects 30. The reflection/backscatter signals are received at the radar unit 12 and subsequent processing enables presentation of corresponding information at a user interface.

Non-linear distortion of the transmit waveform by the RF power amplifier (PA) in a conventional radar system can reduce the performance of the radar, by introducing errors into the radar channel estimates the system produces.

Thus, in the present disclosure, a method is described for mitigating the impact of non-linear transmitter distortion, by using the received radar signals to adaptively estimate the distortion introduced by the transmitter. This distortion can then be properly accounted for when the radar channel is estimated, improving the quality of the estimates (which are then used for subsequent core radar processing tasks such as detection and tracking).

In general terms, the disclosed method starts by using a parametric polynomial series expansion (e.g. a memory polynomial) to approximate the non-linear power amplifier response. A radar waveform is transmitted, and the received radar signal and an initial estimate of the distorted transmit waveform are used to obtain an estimate of the radar channel by deconvolution. This radar channel estimate is then used to improve the estimate of the distorted transmit waveform, by updating the parameters of the polynomial function. This process is repeated iteratively and converges upon an accurate representation of the transmit waveform. It is inherently adaptive, and hence can track changes in the response of the PA and other analogue circuitry.

Aspects of the disclosure are potentially applicable to a variety of radar applications, including full duplex pulse compression weather radar systems, aerospace radar systems and joint radar & communication systems.

Figure 2:
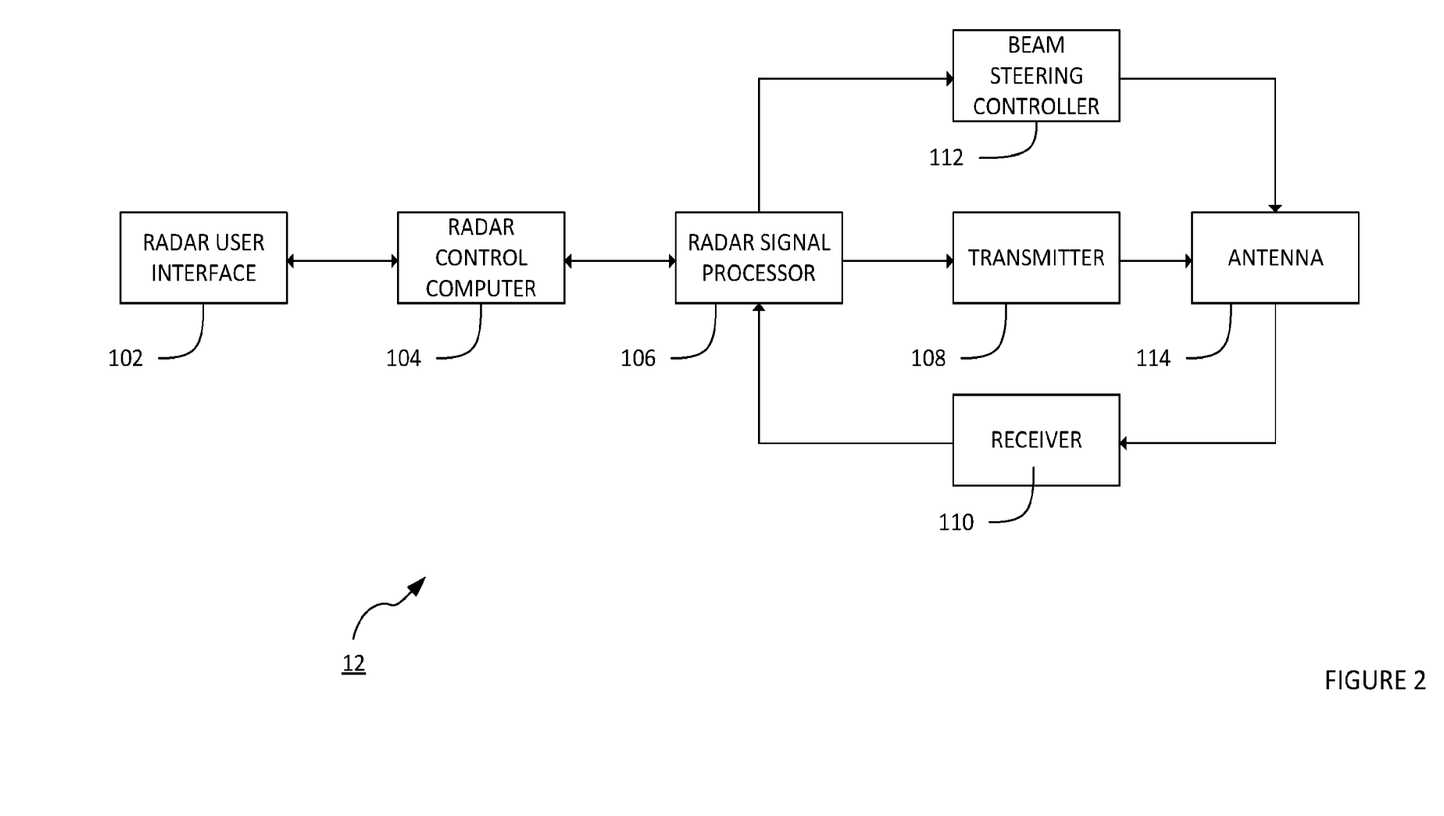
FIG. 2 is a schematic architecture diagram of a radar unit of the embodiment of FIG. 1.

FIG. 2 illustrates the radar unit 12 in schematic form. As shown, a radar user interface 102 presents a display to a user, with suitable input means, to enable a user to interact with the radar unit 12 and to glean information therefrom. The input means could, for example, include push buttons and/or dials, levers, joysticks, pointing devices (e.g. mice, rollerballs, pointers), a keyboard, keypad, touchpad, touch-sensitive screen, gaze detection, speech detection and interpretation, or any other means of imparting user input commands to the radar user interface 102. Similarly, the output to the user, described as a display, could also or alternatively comprise audible output or any other means of imparting radar information to the user.

The user interface 102 integrates with a radar control computer 104 which controls the operation of a radar signal processor 106. The radar signal processor 106 is configured to generate a transmit signal for transmission by a transmitter 108. The transmitter 108 takes the transmit signal and puts it into condition to cause a radar emission at an antenna 114. This can include transposition of the transmit signal to an appropriate transmit frequency, and power amplification.

A beam steering controller 112 operates to ensure that the transmit signal is transmitted at the antenna 114 using beam shaping, to provide focus of the radar on an area of interest. This enables, for instance, a sweep effect of the radar signal across the environment of interest, such that reflections and backscatter can be made to correspond with objects in the environment.

A receiver 110 receives signals at the antenna and conditions them for processing at the radar signal processor 106.

Wideband radars use modulated waveforms (such as chirp signals) to strike a balance between peak transmit power, sensitivity and spatial resolution. They are widely across a range of traditional radar sensing applications, such as aerospace and weather, and are growing in popularity in new applications such as automotive.

In the following description, all mathematical signal models given are written in complex baseband equivalent form. For ease of illustration, however, illustrated examples are of real parts of waveforms.

Figure 3:
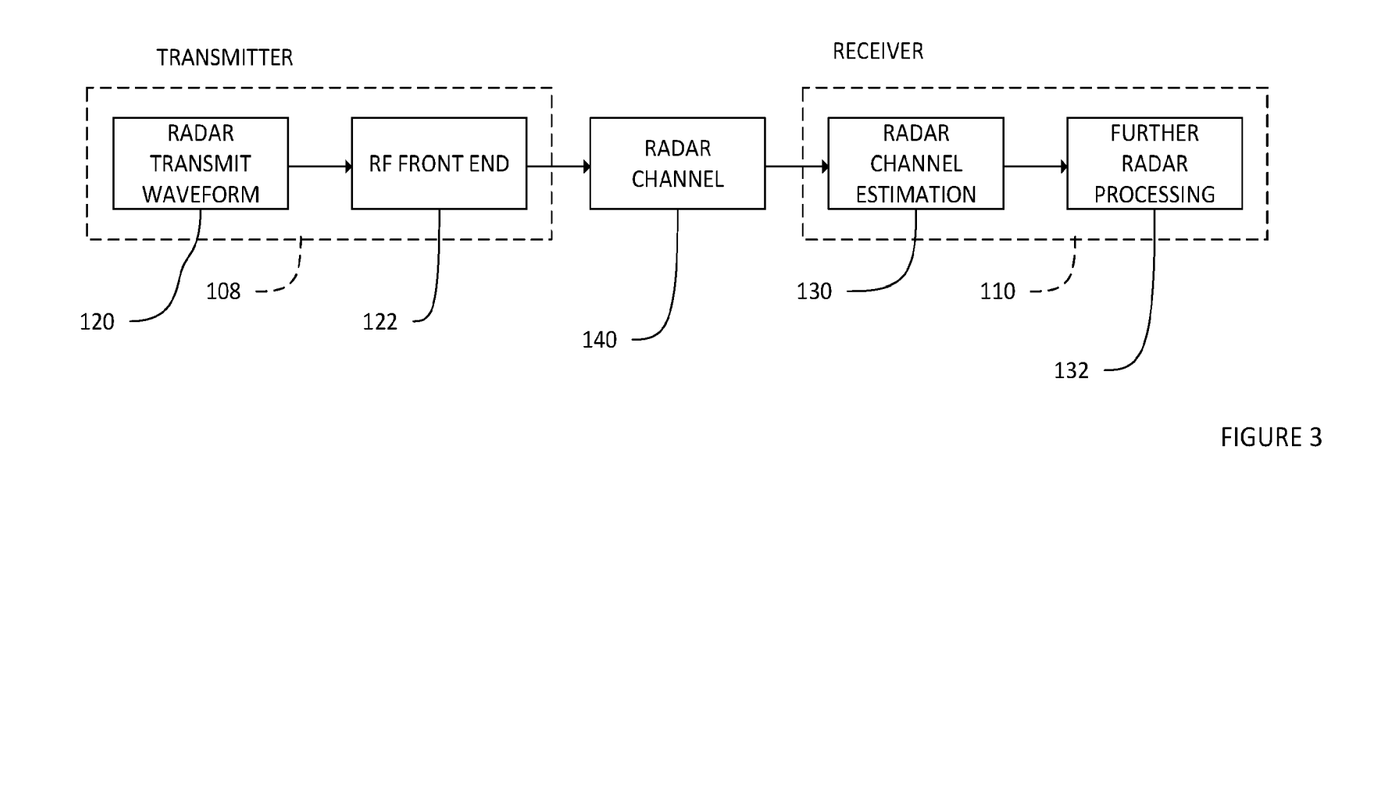
FIG. 3 is a schematic functional architecture of the radar unit in the embodiment of FIG. 1.
Figure 4:
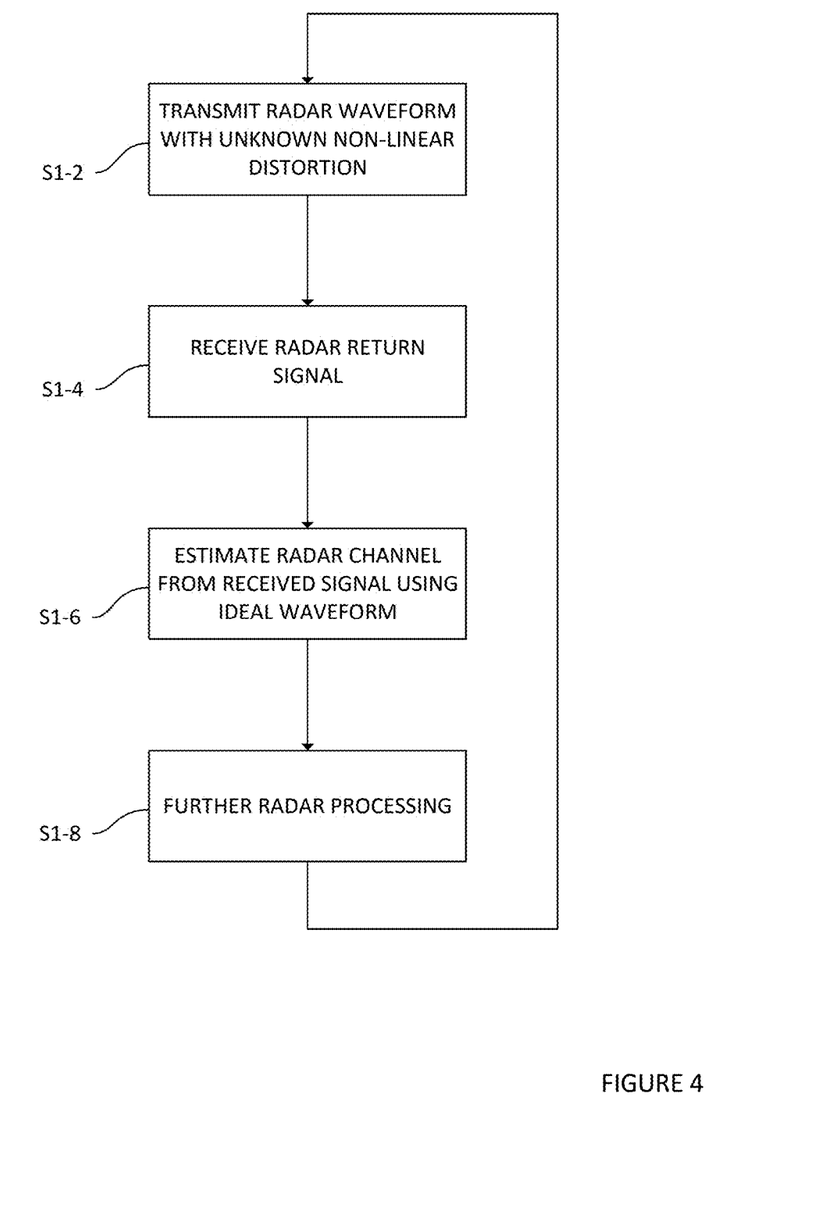
FIG. 4 is a flow diagram of a method of radar channel estimation in accordance with a background example to aid understanding of embodiments disclosed herein.

In simple terms, the radar transmitter 108 transmits the waveform, $x_T[n]$, and then the receiver 110 receives the reflected/backscattered signal, $y[n]$. FIG. 3 is a basic block diagram of an exemplary radar system for the illustration of embodiments disclosed herein. A flowchart of the basic process is shown in FIG. 4.

As shown, the radar transmit waveform 120 is processed (step S1-2) through an RF front end 122, and then the transmitted radar signal passes through a radar channel 140. The received signal at the receiver 110 (step S1-4) is the convolution between the transmitted waveform and the radar channel impulse response, $h_R[n]$, plus receiver noise, $w[n]$.

$$y[n]=x_T[n]*h_R[n]+w[n]$$

This can be equivalently written in matrix-vector form, $$y=X_T h_R+w$$

where:

$X_T$ represents the convolution matrix formed using the transmit waveform $x_T[n]$ $h_R$ is a vector containing the radar channel impulse response $h_R[n]$. Another equivalent representation is $$y = H_R x_T + w$$

where:
$H_R$ represents the convolution matrix formed using the radar channel impulse response $h_R[n]$
$x_T$ is a vector containing the transmit waveform $x_T[n]$ A fundamental radar processing task is to use the received signal to estimate the radar channel impulse response, $\hat{h}_R = f(y)$, from which information about the target environment can then be attained (step S1-6). Channel estimation 130 is indicated as a block in FIG. 3, passing a processed signal to a further radar processing block 132 (step S1-8).

A classical approach to channel estimation is matched filtering, whereby the received signal is correlated with the original transmit signal.

$$\hat{h}_R = X_T^H y$$

This method maximises the return signal to noise ratio (SNR) from an individual scatterer within the environment, and hence is good for detecting weak radar returns. However, the sidelobes present in the matched filter output reduce the spatial resolution, and can lead to masking of weak scatterers by stronger scatters in adjacent range cells.

An alternative approach to impulse response estimation is deconvolution. A variety of deconvolution techniques have been developed for radar applications. Many of the deconvolution approaches are based on the least squares criteria $$\hat{h}_R = \operatorname{argmin} \|y - X_T h_R\|_2^2 + \theta(h_R)$$

where $\theta(\cdot)$ is a suitable regularisation function. When the regularisation is omitted this reduces to a simple linear least squares estimator, $$\hat{h}_R = (X_T^H X_T)^{-1} X_T^H y$$

This achieves high spatial resolution but typically suffers from noise amplification, leading to poor SNR which can significantly impact the ability to detect targets.

Using the assumption of a sparse radar impulse response (i.e., scatterers are present in only some of the range cells), a popular approach is to solve the above problem with an L1 norm regularisation term included:

$$\hat{h}_R = \operatorname{argmin} \|y - X_T h_R\|_2^2 + \lambda \|h_R\|_1$$

This is a non-linear problem known as least absolute shrinkage and selection operator (LASSO) or basis pursuit denoising (BPD). It generally produces a sparse solution that suppresses noise, with the degree of sparsity controlled by A. The BPD approach can lead to a good balance between spatial resolution and SNR, but comes at the expense of an increase in computational complexity since iterative methods are required to solve the regularised minimisation. From basic convex optimisation theory, for appropriate choice of $\epsilon$ this is exactly equivalent to solving $$\hat{h}_R = \operatorname{argmin} \|h_R\|_1 \text{ subject to } \|y - X_T h_R\|_2^2 \leq \epsilon$$

And for appropriate $\zeta$ exactly equivalent to solving $$\hat{h}_R = \operatorname{argmin} \|y - X_T h_R\|_2^2 \text{ subject to } \|h_R\|_1 \leq \zeta$$

Other regularisation functions, $\theta(h_R)$, that do not exploit sparsity are also possible, as well as deconvolution methods that do not use the least squares formulation—such as the well-known 'CLEAN' method.

When performing deconvolution using the above (or other) methods, it is generally assumed that the transmit waveform, $x_T[n]$, is perfectly known. This is a reasonable assumption in many cases, since the transmit waveform is often generated digitally within the radar.

Figure 6:
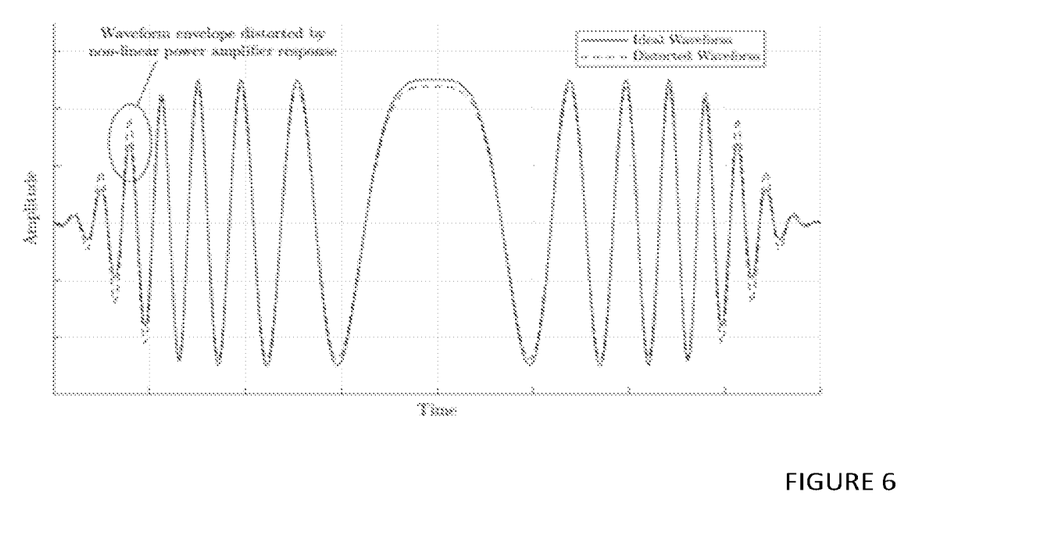
FIG. 6 is a graph comparing ideal and distorted transmit waveforms, in the time domain, for the non-linear amplifier of the background example.

However, when a radar system suffers from transmitter impairments, the signal radiated from the antenna may differ from the ideal (digitally-generated) waveform, $x[n]$. In particular, when the waveform does not have a constant envelope (i.e when the instantaneous power varies), non-linearities in the transmitter power amplifier (PA) distort the waveform. A typical example of this is illustrated in FIG. 6.

The output of the non-linear PA can be modelled as a non-linear function with memory L:

$$x[n] = g(x[n], x[n-1], \ldots, x[n-L+1]),$$

Figure 5:
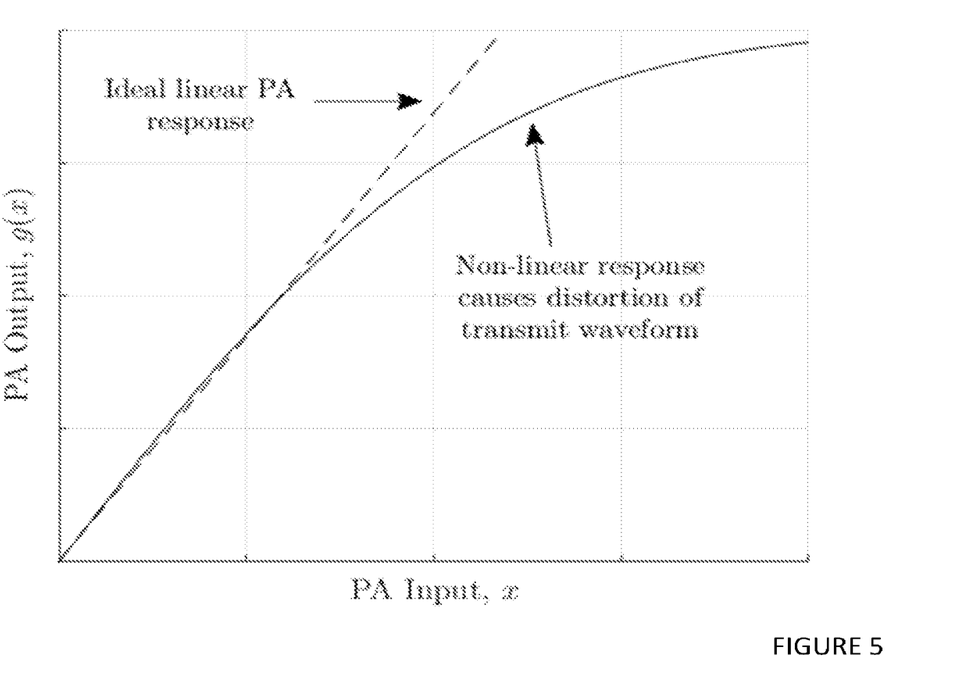
FIG. 5 is a graph of input-output response for a non-linear amplifier of the background example.

An illustrative example non-linear function with memory L=1 is shown in FIG. 5.

Figure 7:
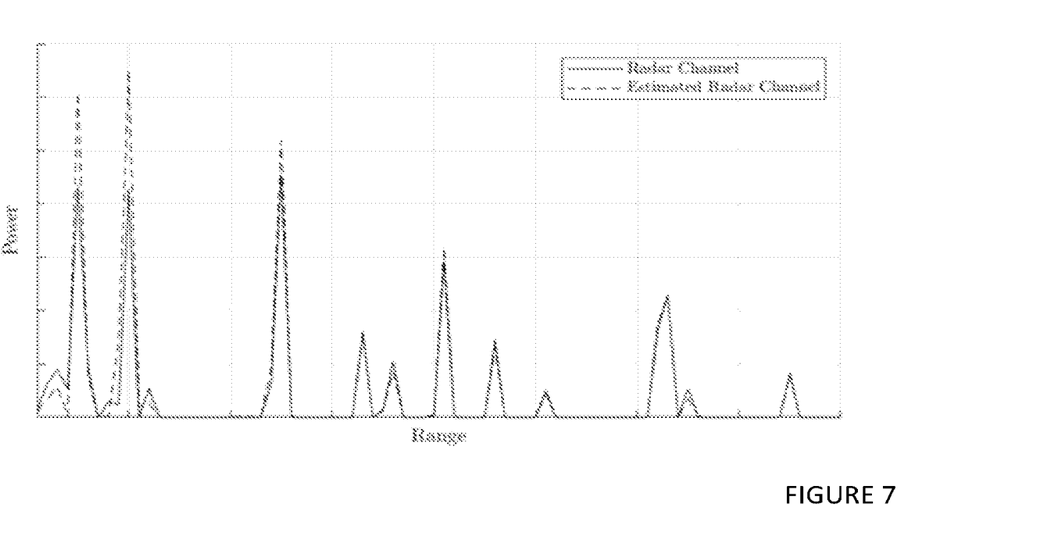
FIG. 7 is a graph illustrating error in radar channel estimation for the background example.

If the non-linear distortion is not accounted for, the mismatch between the ideal waveform and the actual transmit waveform can lead to significant errors during deconvolution. This is illustrated in FIG. 7, obtained using the BPD method. Errors occur particularly when estimating stronger parts of the radar channel—which typically correspond to scatterers at shorter ranges. This can also cause problems in full duplex radar systems, where high power leakage between transmitter and receiver cannot be accurately estimated without accounting for the non-linear distortion components.

Examples disclosed herein provide a method for accurately & adaptively estimating the non-linearly distorted transmitted signal, so that accurate deconvolution of the radar return channel can be achieved.

Figure 8:
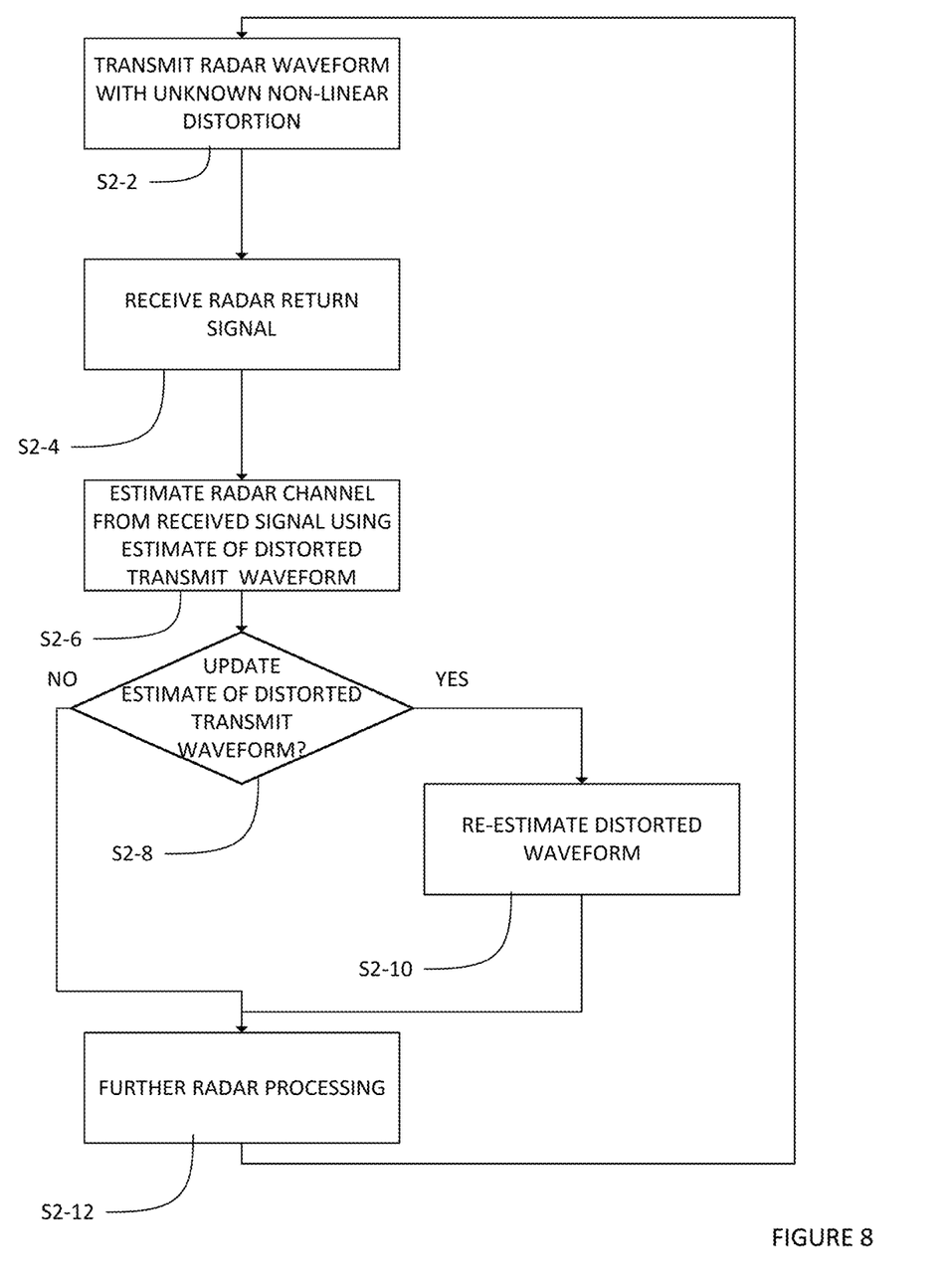
FIG. 8 is a flow diagram of a method of radar channel estimation in accordance with an embodiment.

FIG. 8 is a flow diagram for a method in accordance with an embodiment.

The non-linear function associated with a PA can generally be well-approximated by a polynomial expansion, such as a memory polynomial $$x_T[n] = \sum_l \sum_p a_{l,p} x[n-l] |x[n-l]|^{2p}$$

This function contains a linear sum of non-linear terms, and is fully parameterised by the coefficients $a_{l,p}$. A variety of other non-linear models with similar structures can also be used (e.g. the Volterra series).

Using the above, the transmit waveform, $x_T[n]$, can be written in vector form as $$x_T = X_{NL} a$$

where each column of $X_{NL}$ contains a vector generated using the ideal waveform, $x[n]$, and a single polynomial term, for example $x[n-l]|x[n-l]|^{2p}$. For a given waveform, the matrix $X_{NL}$ is fixed and the non-linear function depends on the coefficients $a_{l,p}$ contained in the vector a.

The method, as before, commences by transmitting the radar waveform $x_T[n]$, with unknown non-linear distortion, from the transmitter RF front end 122 (step S2-2). The radar return signal is received at the receiver 130 (step S2-4). The algorithm starts (step S2-6) by assuming some initial estimate of the transmit signal is available, $$\hat{x}_T^{(i)} = X_{NL} \hat{a}^{(i)}$$

This transmit signal estimate is used to estimate the radar return channel using some deconvolution method, such as BPD:

$$\hat{h}_R = \mathrm{argmin} \left\| y - \hat{X}_T^{(i)} h_R \right\|_2^2 + \lambda \|h_R\|_1$$

Other deconvolution techniques could also be used. Providing the initial estimate $\hat{x}_T^{(i)}$ is reasonably close to the true waveform, a reasonably accurate radar channel estimate $\hat{h}_R$ can be obtained.

A decision is then taken (S2-8) as to whether to update the estimate of the distorted transmit waveform. This decision is based on whether the estimate has become impaired. This can be determined based on SNR. In general terms, in one embodiment, the update is performed when the level of noise exceeds a pre-set threshold. That threshold may be equal to the minimum power of the echo signal. In a specific embodiment, the threshold may be set at −108 dBm. So, when the SNR has become degraded to the threshold, the estimate is updated.

The radar channel estimate can then be used to update the estimate of the transmit signal (step S2-10). This is done by formulating a regularised least squares problem to estimate $\hat{a}^{(i+1)}$:

$$\hat{a}^{(i+1)} = \mathrm{argmin} \left\| y - \hat{H}_R X_{NL} a \right\|_2^2 + \gamma \left\| a - \hat{a}^{(i)} \right\|_2^2$$

The regularisation term here is used to ensure that the new estimate is close to the old estimate, helping prevent overfitting and reducing noise. The degree of similarity is controlled by the γ, and setting γ=0 removes the regularisation constraint. The parameter γ could optionally be changed at each iteration. Other related variants of regularised least squares optimisation could also be used to obtain $\hat{a}^{(i+1)}$.

The solution to the above least squares problem, and updated estimate of a, is given by:

$$\hat{a}^{(i+1)} = \hat{a}^{(i)} + W(y - \hat{H}_R X_{NL} \hat{a}^{(i)})$$

where $$W = (X_{NL}^H \hat{H}_R^H \hat{H}_R X_{NL} + \gamma I)^{-1} X_{NL}^H \hat{H}_R^H$$

Here it will be noted that the columns of the matrix $\hat{H}_R X_{NL}$ represent convolutions, and hence can be computed very efficiently using fast convolution techniques. Therefore, the main computational burden is the matrix inversion operation in W. This can be kept low by appropriately limiting the number of memory polynomial terms used in the model. Other numerical optimisations to minimise the computational complexity of solving the above problem efficiently may be possible.

To further mitigate the impact of noise and overfitting, a damping factor, 0<μ≤1, may optionally be introduced:

$$\hat{a}^{(i+1)} = \hat{a}^{(i)} + \mu W(y - \hat{H}_R X_{NL} \hat{a}^{(i)})$$

The new transmit waveform estimate is then formed:

$$\hat{x}_T^{(i+1)} = X_{NL} \hat{a}^{(i+1)} = \hat{x}_T^{(i)} + \mu X_{NL} W(y - \hat{H}_R \hat{x}_T^{(i)})$$

To ensure the transmit waveform maintains the correct power scaling, a scaling factor can optionally be used, but may not be required.

$$\hat{x}_T^{(i+1)} = \beta^{(i+1)} X_{NL} \hat{a}^{(i+1)}$$

This power constraint could also be enforced in some other way, for example by introducing an additional constraint directly into the least squares problem.

The new estimate of the transmit signal should be used for deconvolution of the next received radar signal (S2-12), and the process repeated. Once the method has converged to an accurate estimate of the transmit signal, re-estimation of the transmit signal can be performed periodically to track any changes to the non-linear function that may occur due to heating effects & drift in the PA.

Figure 9:
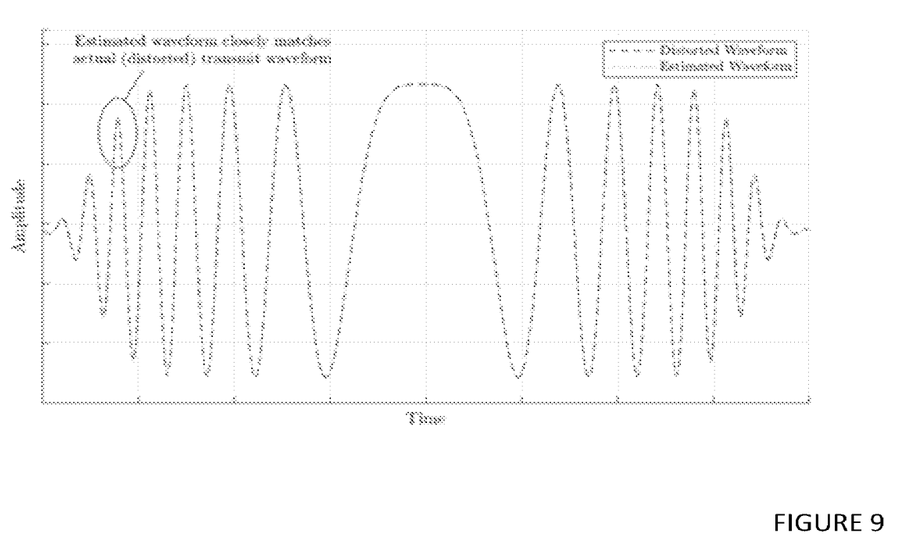
FIG. 9 is a graph comparing distorted and estimated transmit waveforms, in the time domain, for the non-linear amplifier of the embodiment.

Using the disclosed method, an accurate reconstruction of the non-linearly distorted waveform can be obtained, as illustrated in FIG. 9, which provides a comparison between a distorted waveform and estimated waveform. The graph represents baseband response, with the real part thereof only shown.

Figure 10:
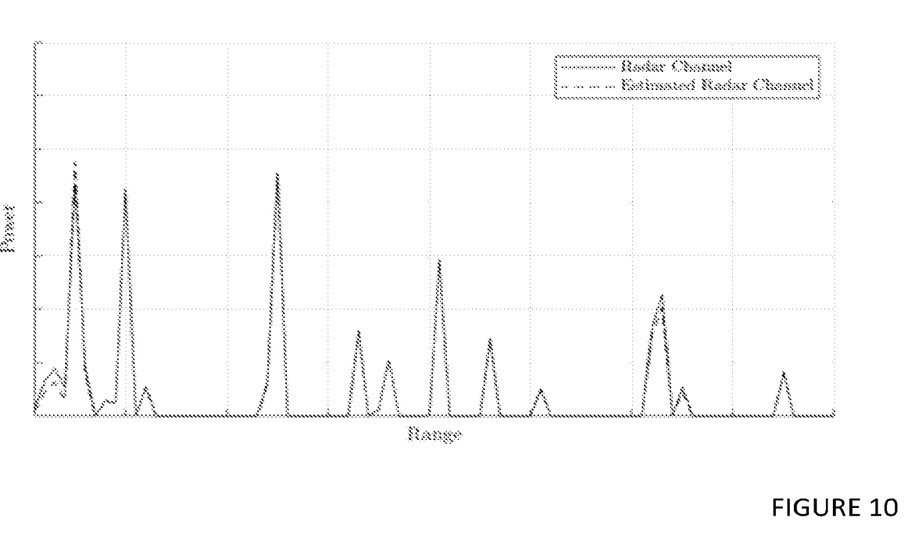
FIG. 10 is a graph illustrating error in radar channel estimation for the embodiment.

The improved waveform estimate enables better radar channel estimates to be obtained. This is illustrated in FIG. 10. The estimated channel has smaller errors than in the example shown in FIG. 7.

Figure 11:
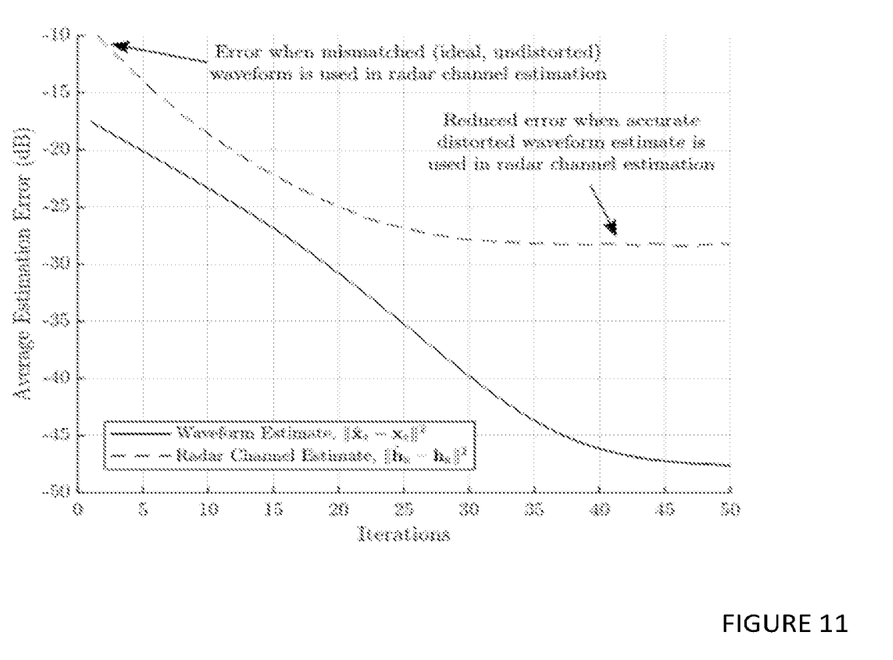
FIG. 11 is a graph illustrating how waveform and radar channel estimates improve as the method of the embodiment converges.

The convergence of the disclosed method is shown in FIG. 11. At iteration 1, the ideal (undistorted) waveform is used in deconvolution, producing a radar channel estimate with higher error. As the number of iterations increases, the error in the estimate of the waveform decreases from −18 dB to −48 dB. This in turn improves the radar channel estimation error from −10 dB to −28 dB.

The matrix $X_{NL}$ will often have correlated columns, which can lead to poor conditioning of the matrix $\hat{H}_R X_{NL}$. To reduce numerical errors and noise in the waveform estimate, it can be useful to instead use an orthonormal basis to represent $x_T$, $$x_T = X_{NL} a = Q_{NL} z$$

where the columns of $Q_{NL}$ are mutually orthogonal and span the same column space as $X_{NL}$ (calculated using the QR decomposition, for example). The model is now defined by the parameter vector z, and the problem can be restated as $$\hat{z}^{(i+1)} = \mathrm{argmin} \left\| y - \hat{H}_R Q_{NL} z \right\|_2^2 + \gamma \left\| z - \hat{z}^{(i)} \right\|_2^2$$

leading to the update $$\hat{x}_T^{(i+1)} = \beta^{(i+1)} (\hat{x}_T^{(i)} + \mu Q_{NL} W_Q (y - \hat{H}_R \hat{x}_T^{(i)}))$$

with $$W_Q = (Q_{NL}^H \hat{H}_R^H \hat{H}_R Q_{NL} + \gamma I)^{-1} Q_{NL}^H \hat{H}_R^H$$

The reader will recognise that this does not give the same solution to the original formulation at each iteration, but will converge to a similar overall solution. Other related least square formulations for estimating the polynomial coefficients are also possible, and should be covered by this patent.

Note that the method of the present disclosure can also be applied in a context where the ideal transmit waveform changes, which can be accounted for by updating the matrix $X_{NL}$. This could be applicable, for example, to a joint communications & radar systems.

Variations in how the above procedure is implemented are also possible. For example, a single estimated radar channel could be used to update the distorted waveform estimate, which could then be used to re-estimate the radar channel from the same received signal (i.e. rather than just using it for subsequent received signals).

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method comprising:
receiving a radar signal at a radar receiver, the received radar signal being consequent from a radar signal transmitted at a radar transmitter, the transmitted radar signal including an unknown distorted transmit waveform;
assuming the unknown distorted transmit waveform;
estimating a radar return channel using the received radar signal and the assumed distorted transmit waveform, the radar return channel being for a radar return channel defined between the radar transmitter and the radar receiver, the radar return channel being used to update an estimate of the transmitted radar signal;
determining whether to update an estimate of the distorted transmit waveform using the estimated radar return channel;
updating the estimate of the distorted transmit waveform using the estimated radar return channel when a level of noise in the received radar signal exceeds a pre-set threshold; and
updating the radar return channel with the updated estimate of the distorted transmit waveform to converge on an accurate representation of a transmit waveform.

2. The method of claim 1 wherein the determining whether to update the estimate is dependent on a measure of degradation of an existing radar return channel estimate.

3. The method of claim 2 further comprising generating the measure of degradation of the existing radar return estimate on the basis of processing of the received radar signal using the estimated radar return channel.

4. The method of claim 3 wherein the measure of degradation comprises a signal to noise ratio.

5. The method of claim 4 wherein determining the whether to update the estimate is dependent on the signal to noise ratio falling below a predetermined threshold.

6. The method of claim 5 wherein the predetermined threshold is related to a minimum power measure of the received radar signal.

7. The method of claim 1 wherein the determining of whether to update the estimate comprises determining a distortion model, the distortion model describing a transfer function relating the received radar signal to a corresponding transmitted radar signal, the distortion model being a polynomial model defined by a plurality of distortion polynomial coefficients.

8. The method of claim 7 wherein the distortion model comprises a non-linear polynomial model.

9. The method of claim 7 wherein the polynomial coefficients of the distortion model are determined by way of a fitting process.

10. The method of claim 9 wherein the fitting process comprises a deconvolution process.

11. The method of claim 10 wherein the deconvolution process comprises a least squares optimisation.

12. The method of claim 11 wherein the least squares optimisation comprises a regularised least squares optimisation.

13. A radar receiver comprising:
a signal processor operable to
receive a radar signal at the radar receiver, the received radar signal being consequent from a radar signal emitted at a radar transmitter, the transmitted radar signal including an unknown distorted transmit waveform,
assume the unknown distorted transmit waveform, and
estimate a radar return channel using the received radar signal and the assumed distorted transmit waveform, the radar return channel being for a radar return channel defined between the radar transmitter and the radar receiver, the radar return channel being used to update an estimate of the transmitted radar signal; and
a channel estimator operable to
determine whether to update an estimate of the distorted transmit waveform using the estimated radar return channel estimate,
update the estimate of the distorted transmit waveform using the estimated radar return channel when a level of noise in the receiver radar signal exceeds a pre-set threshold, and
update the radar return channel with the updated estimate of the distorted transmit waveform to converge on an accurate representation of a transmit waveform.

14. The receiver of claim 13 wherein the channel estimator is operable to determine whether to the updated estimate dependent on a measure of degradation of an existing radar return channel estimate.

15. The receiver of claim 13 wherein the channel estimator is operable to determine whether to update the estimate by determining a distortion model, the distortion model describing a transfer function relating the received radar signal to a corresponding transmitted radar signal, the distortion model being a polynomial model defined by a plurality of distortion polynomial coefficients.

16. The receiver of claim 15 wherein the distortion model comprises a non-linear polynomial model.

17. The receiver of claim 15 wherein the polynomial coefficients of the distortion model are determined by way of a fitting process.

18. The receiver of claim 17 wherein the fitting process comprises a deconvolution process.

19. The receiver of claim 18 wherein the deconvolution process comprises a least squares optimisation.

20. A radar system comprising a radar transmitter for emitting a radar signal and a radar receiver, wherein the radar receiver comprises:
a signal processor operable to
receive a radar signal at the radar receiver, the received radar signal being consequent from a radar signal emitted at the radar transmitter, the transmitted radar signal including an unknown distorted transmit waveform,
assume the unknown distorted transmit waveform, and
estimate a radar return channel using the received radar signal and the assumed distorted transmit waveform, the radar return channel being for a radar return channel defined between the radar transmitter and the radar receiver, the radar return channel being used to update an estimate of the transmitted radar signal; and a channel estimator operable to
- determine whether to update an estimate of the distorted transmit waveform using the estimated radar return channel,
- update the estimate of the distorted transmit waveform using the estimated radar return channel when a level of noise in the received radar signal exceeds a pre-set threshold, and
- update the radar return channel with the updated estimate of the distorted transmit waveform to converge on an accurate representation of a transmit waveform.

* * * * *